US009200668B2

(12) United States Patent
Lacombe et al.

(10) Patent No.: US 9,200,668 B2
(45) Date of Patent: Dec. 1, 2015

(54) COMPOSITE MATERIAL ROLLER FOR HIGH-TEMPERATURE ANNEALING

(75) Inventors: Alain Lacombe, Pessac (FR); Marc Lacoste, Gradignan (FR); Rémi Bessettes, Tresses (FR); Olivier Drevet, Le Taillan Medoc (FR)

(73) Assignee: HERAKLES, Le Haillan (FR)

( * ) Notice: Subject to any disclaimer, the term of this patent is extended or adjusted under 35 U.S.C. 154(b) by 430 days.

(21) Appl. No.: 13/877,692

(22) PCT Filed: Sep. 1, 2011

(86) PCT No.: PCT/FR2011/052006
§ 371 (c)(1),
(2), (4) Date: Aug. 5, 2013

(87) PCT Pub. No.: WO2012/045935
PCT Pub. Date: Apr. 12, 2012

(65) Prior Publication Data
US 2013/0310238 A1  Nov. 21, 2013

(30) Foreign Application Priority Data

Oct. 7, 2010  (FR) ..................................... 10 58140

(51) Int. Cl.
*F16C 13/00* (2006.01)
*F16D 1/08* (2006.01)
(Continued)

(52) U.S. Cl.
CPC ................ *F16C 13/00* (2013.01); *C21D 9/563* (2013.01); *F16D 1/0876* (2013.01); *F27D 3/026* (2013.01); *F27D 5/00* (2013.01); *C21D 9/562* (2013.01); *F16B 3/00* (2013.01)

(58) Field of Classification Search
CPC .......... F16C 13/00; F16C 13/006; F27B 9/00; F27B 9/24; F27B 9/2407; F27D 2003/0042; F27D 2003/043; F27D 2003/004; F27D 3/026; F27D 3/028; B21D 27/021; B21D 39/008; B21D 28/00; B21B 2203/18; B65H 27/00; B65H 20/02; B65H 20/04; B65H 29/20; B65H 29/22; B65H 2301/44324; B65H 2301/44243; B65H 2301/443246; B65H 2404/1375; B65H 2404/181; B65H 2515/40; B65H 2515/41; B65H 2601/24; Y10T 29/49556; Y10T 29/49549
USPC ..................................................... 492/42, 45
See application file for complete search history.

(56) References Cited

U.S. PATENT DOCUMENTS 2,950,097 A     8/1960  Tohir
5,649,889 A *  7/1997  Warner, III ..................... 492/16
(Continued)

FOREIGN PATENT DOCUMENTS

FR          875 630       9/1942
JP          58-081917     5/1983
(Continued)

OTHER PUBLICATIONS

International Search Report as issued for PCT/FR2011/052006.

*Primary Examiner* — Jason L Vaughan
(74) *Attorney, Agent, or Firm* — Pillsbury Winthrop Shaw Pittman LLP

(57) ABSTRACT

A roller for a high temperature annealing line includes a cylindrical shell and an axial support element and including a spindle at at least one of its ends, and first and second keys fastened to the axial support element and each arranged in a respective first or second through opening formed in the shell. The first key is mounted to bear against a first circumferential bearing surface of the first through opening while the second key is mounted against a second circumferential bearing surface of the second through opening opposite to the first circumferential bearing surface of the first through opening in a circumferential travel direction. The first key is mounted to bear against the second longitudinal bearing surface of the first through opening, while the second key is mounted against the first longitudinal bearing surface of the second through opening opposite to the second longitudinal bearing surface.

13 Claims, 7 Drawing Sheets

(51) Int. Cl.
    *F27D 3/02*    (2006.01)
    *F27D 5/00*    (2006.01)
    *C21D 9/56*       (2006.01)
    *F16B 3/00*       (2006.01)

(56) References Cited

U.S. PATENT DOCUMENTS 5,906,567 A * 5/1999 Gautier ........................ 492/16
6,520,896 B1 * 2/2003 Sohl ............................. 492/45
6,620,084 B2 * 9/2003 Daily et al. .................... 492/45
2002/0169060 A1 11/2002 Dietsch
2007/0232471 A1 * 10/2007 Song et al. .................... 492/46
2009/0036283 A1 2/2009 Maumus

FOREIGN PATENT DOCUMENTS

JP    59-137170    8/1984
JP    03-229830    10/1991

\* cited by examiner

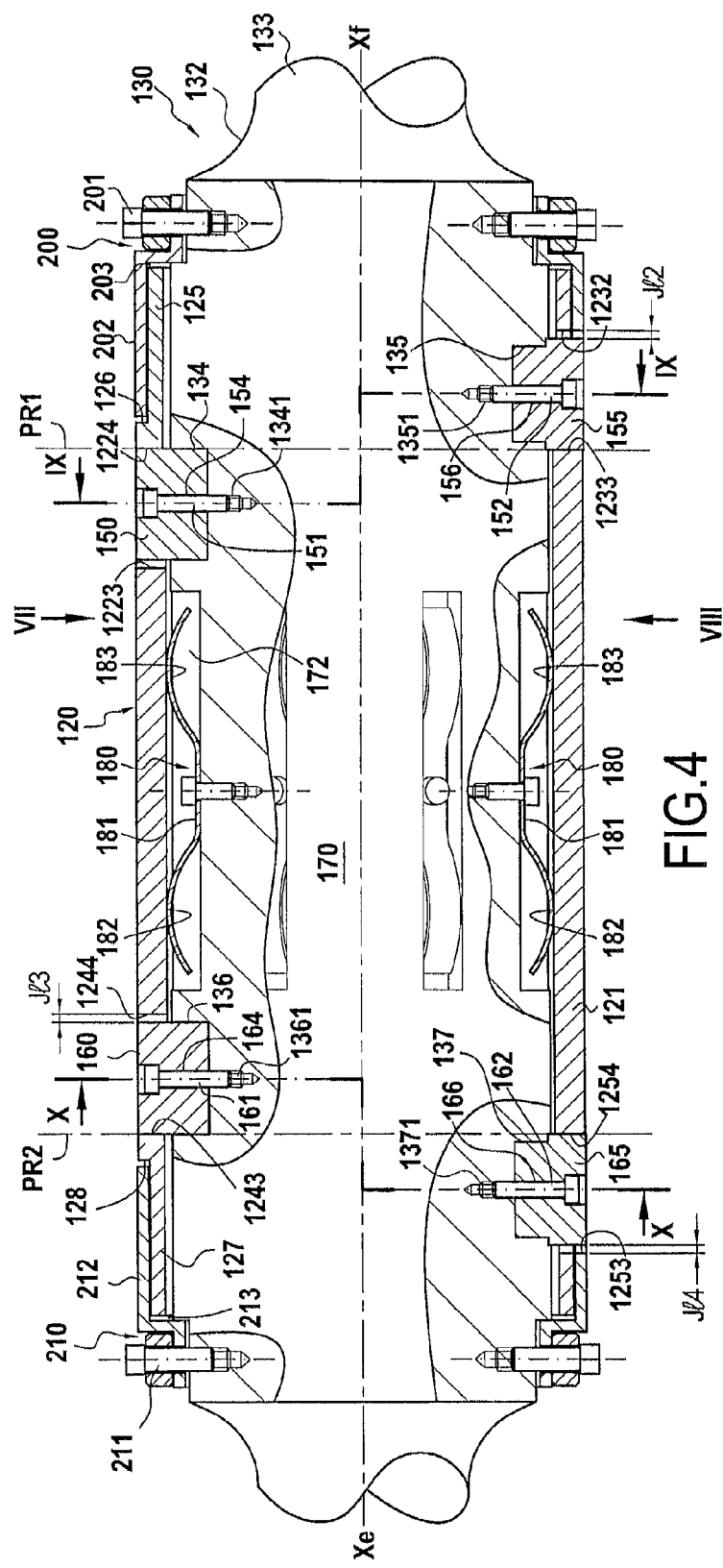

COMPOSITE MATERIAL ROLLER FOR HIGH-TEMPERATURE ANNEALING

CROSS REFERENCE TO RELATED APPLICATIONS

This application is the U.S. National Stage of PCT/FR2011/052006 filed Sep. 1, 2011, which in turn claims priority to French Application No. 1058140, filed Oct. 7, 2010. The contents of both applications are incorporated herein by reference in their entirety.

BACKGROUND OF THE INVENTION

The present invention relates to the field of rollers used for transporting, guiding, or shaping industrial products and intended to be subjected to large temperatures and temperature gradients. More particularly, but not exclusively, the invention relates to rollers for very high-temperature annealing lines such as those used for fabricating very high performance steel, and in which temperatures higher than 1000° C. are reached.

Since sheet steel has very little strength at such temperatures, it is not conceivable to apply traction to the strip, so it becomes necessary to have very close support for the strip in order to prevent it from suffering creep and in order to guide it. Consequently, a very high-temperature annealing line needs to have a roller once every 0.5 meters (m) to 2 m. Each of the rollers is also motor-driven, and the set of rollers is synchronized so as to accompany the movement of the strip without applying any traction force and while minimizing friction.

The rollers used in that type of annealing line typically have diameters, by way of example and not exclusively, of about 100 millimeters (mm) and generally less than 500 mm, and a support surface of length generally lying in the range 500 mm to 3000 mm.

The rollers used in that type of industry are generally made of refractory steel with surface coatings (of the ceramic oxide, zirconia, silica, etc. type), however at temperatures above 1000° C. they present limited lifetimes in annealing lines and they need to be replaced frequently (generally once every one to five months) because of wear.

Rollers made of ceramic or of graphite that accept higher temperatures are in widespread use. However, such rollers are relatively fragile, which limits their lifetime. The invention also relates to the rollers present in lines for annealing sheet steels that are treated at lower temperatures, typically in the range 600° C. to 900° C., but that are subjected to high levels of traction. For that type of treatment, steel rollers are commonly used, however because of their significant coefficient of expansion, they can deform under the effect of temperature, which can sometimes lead to folds forming in the metal sheet (commonly referred to as "heat buckles") or to the sheet being poorly guided (diverted). Under such circumstances, those rollers generally present larger diameters, typically in the range 500 mm to 1000 mm, with the load carrying surface possibly reaching 2000 mm in length.

Document U.S. Pat. No. 6,709,372 discloses an annealing roller for transporting a metal strip in a continuous annealing plant, the roller having a collar or shell that is made either of carbon-carbon (C—C) composite material, i.e. a material comprising carbon fiber reinforcement densified by a carbon matrix, or else of SiC—SiC composite material, i.e. a material made of SiC fiber reinforcement densified by an SiC matrix. Document U.S. 2009/036283 also describes a roller for use in high-temperature steel-making or metallurgical plant with a collar made of C—C composite material.

Although a roller having a C—C or SiC—SiC composite material ferule possesses better thermomechanical performance than a roller having a steel collar, the use of those two composite materials nevertheless presents drawbacks.

Such rollers generally require the use of a metal shaft that passes through them in order to provide mechanical strength. Under such circumstances, it is necessary to have means for providing rotary coupling between the metal shaft and the collar of composite material in order to enable the shaft to drive the collar in rotation.

However, because of the differential thermal expansion between the shaft and the collar, specific means need to be provided either to limit expansion of the shaft or to compensate for the differential expansion.

When limiting expansion, there exist devices that enable the shaft to be cooled actively against very high temperatures, e.g. by circulating a cooling fluid inside the shaft. The need to have active cooling makes the plant more complex and consumes a large amount of energy.

When compensating differential expansion, solutions have been developed to enable the metal shaft to expand while limiting the stresses it applies to the composite collar which, in contrast, expands very little at high temperature. Document U.S. 2009/036283 discloses a roller having a metal shaft with a shell or collar made of thermostructural composite material arranged thereabout. In order to compensate for differential expansion between the shaft and the shell, radial clearance is left between those two elements. Although that solution is effective in compensating differential radial expansion, it nevertheless requires grooves to be formed in the outer surface of the shaft and teeth on the inner surface of the shell for engaging in the grooves in the shaft so as to enable the shell to be driven in rotation by the shaft.

Those special shapes make fabricating the roller more complex and they increase its cost. Furthermore, positioning (centering) the collar on the shaft, when cold, also presents difficulties because of the large amount of radial clearance that is present between the shell and the shaft when cold.

OBJECT AND SUMMARY OF THE INVENTION

An object of the present invention is to provide a novel roller structure comprising a collar or shell of composite material with an outside shape that does not vary under the effect of high temperatures, in particular temperatures higher than 1000° C., and/or during rapid changes of temperature, with this being achieved while ensuring a rotary connection between the shell and a metal shaft by means that are simple and reliable and that also enable differential expansion between those two elements to be compensated.

For this purpose, the present invention provides a roller for a high temperature annealing line, the roller comprising a cylindrical shell made of composite material and an axial support element made of metal material and including a spindle at at least one of its ends, the roller being characterized:

in that it further comprises at least first and second keys fastened to the axial support element and each arranged in a respective first or second through opening formed in the shell, said through openings presenting dimensions that are greater than the dimensions of the keys, each through opening including in a determined travel direction along the circumference of the shell, first and second circumferential bearing surfaces and, in a determined axial travel direction, first and second longitudinal bearing surfaces;

in that the first key is mounted to bear against the first circumferential bearing surface of the first through opening while the second key is mounted against the second circumferential bearing surface of the second through opening; and in that the first key is mounted to bear against the second longitudinal bearing surface of the first through opening, while the second key is mounted against the first longitudinal bearing surface of the second through opening.

The cylindrical shell of the roller of the invention, i.e. the body of the roller that is to support sheet metal at high temperatures, is made of thermostructural composite material. Because of the excellent thermal, mechanical, and thermomechanical performance of thermostructural composite materials, the roller of the invention can function at temperatures that are higher than those that can be withstood by steel, i.e. temperatures higher than 1000° C. and possibly up to 1300° C., and it can do this without presenting the weakness of ceramic or graphite.

Thermostructural composite materials (fiber reinforcement densified by a matrix) also present structural characteristics that are sufficient to withstand the loads that are supported by prior art rollers. In addition, such materials, such as C—C or ceramic matrix composite (CMC) material, present a low coefficient of thermal expansion, making it possible to avoid the shell deforming under the effect of high temperatures, thereby conserving the outside shape of the roller while temperature is rising or falling. These characteristics in combination are also particularly advantageous for fabricating rollers that are fitted to annealing lines for sheet metal that is treated under high levels of tension and at high temperatures, since they make it possible to limit the risks of heat buckles and of diversion.

Furthermore, rotary drive is delivered to the cylindrical shell via keys that are secured to the mandrel of at least one spindle. Consequently, driving torque is transmitted using elements that are simple, few in number, and inexpensive.

Furthermore, because of the opposing circumferential thrusts of the keys against the cylindrical shell, the shell can be driven by the spindle in both directions of rotation while leaving between each key and the corresponding through opening in the shell sufficient circumferential clearance to enable the keys to expand and/or move as a result of the spindle expanding without exerting excessive levels of stress on the shell. Limiting stresses on the shell in this way in the event of differential expansion between the key/spindle and the shell is also achieved in the axial direction by the opposing bearing surfaces between the keys and the shell in the axial direction.

Furthermore, given the low mass and the low inertia of the roller of the invention in comparison with a roller made of steel, the levels of power needed for driving it are considerably smaller.

According to a characteristic of the invention, the first and second keys are arranged in the vicinity of a first end of the axial support element, the roller further including at least third and fourth keys arranged in the vicinity of the second end of the axial support element, said third and fourth keys being fastened to the axial support element and each being arranged in a respective third or fourth through opening formed in the shell, said through openings presenting dimensions greater than the dimensions of the keys, each through opening including, in the determined travel direction along the circumference of the shell, first and second circumferential bearing surfaces and, in said determined axial travel direction, first and second longitudinal bearing surfaces. The third key is mounted to bear against the second circumferential bearing surface of the third through opening, while the fourth key is mounted against the first circumferential bearing surface of the fourth through opening. The third key is mounted to bear against the first longitudinal bearing surface of the third through opening, while the fourth key is mounted against the second longitudinal bearing surface of the fourth through opening.

According to another characteristic of the invention, each spindle has a centering spacer co-operating with a shoulder formed at an end of the shell so as to facilitate centering the spindles with the cylindrical shell, while cold.

According to another characteristic of the invention, the roller also includes an axial support element of metal material arranged inside the cylindrical shell in line with the spindle, and at least one elastically deformable element arranged between the outer surface of the axial support element and the inner surface of the shell. This resilient connection between the cylindrical shell and the axial support element serves to compensate for differential expansion between those elements, while also centering the axis of the shell on the axis of the axial support element, both when cold and at high temperature.

This resilient connection may be provided in particular either by means of a plurality of spring tongues or else by graphite sheet skids that are uniformly distributed in the circumferential space between the outer surface of the axial support element and the inner surface of the shell, or else by a spring blade in the form of a split ring arranged in the circumferential space between the outer surface of the axial support element and the inner surface of the shell.

According to another aspect of the invention, the cylindrical shell is made of a carbon-carbon (C—C) composite material that presents both a low coefficient of thermal expansion and good thermal conductivity. Other thermostructural composite materials presenting a ratio of thermal expansion coefficients over thermal conductivity that is close to zero, such as CMC materials, may also be used for making the cylindrical shell.

BRIEF DESCRIPTION OF THE DRAWINGS

Other characteristics and advantages of the invention appear from the following description of particular embodiments of the invention, given as non-limiting examples and with reference to the accompanying drawings, in which:

FIG. 4 is a section view on plane IV-IV of FIG. 1;

FIGS. 5 and 6 show keys of the FIG. 1 roller;

DETAILED DESCRIPTION OF AN EMBODIMENT

A particular, but non-exclusive, field of application of the invention is that of continuous annealing lines or plant in which strips of sheet metal are treated at temperatures higher than 1000° C., e.g. strips of very high performance steel.

Figure 1:
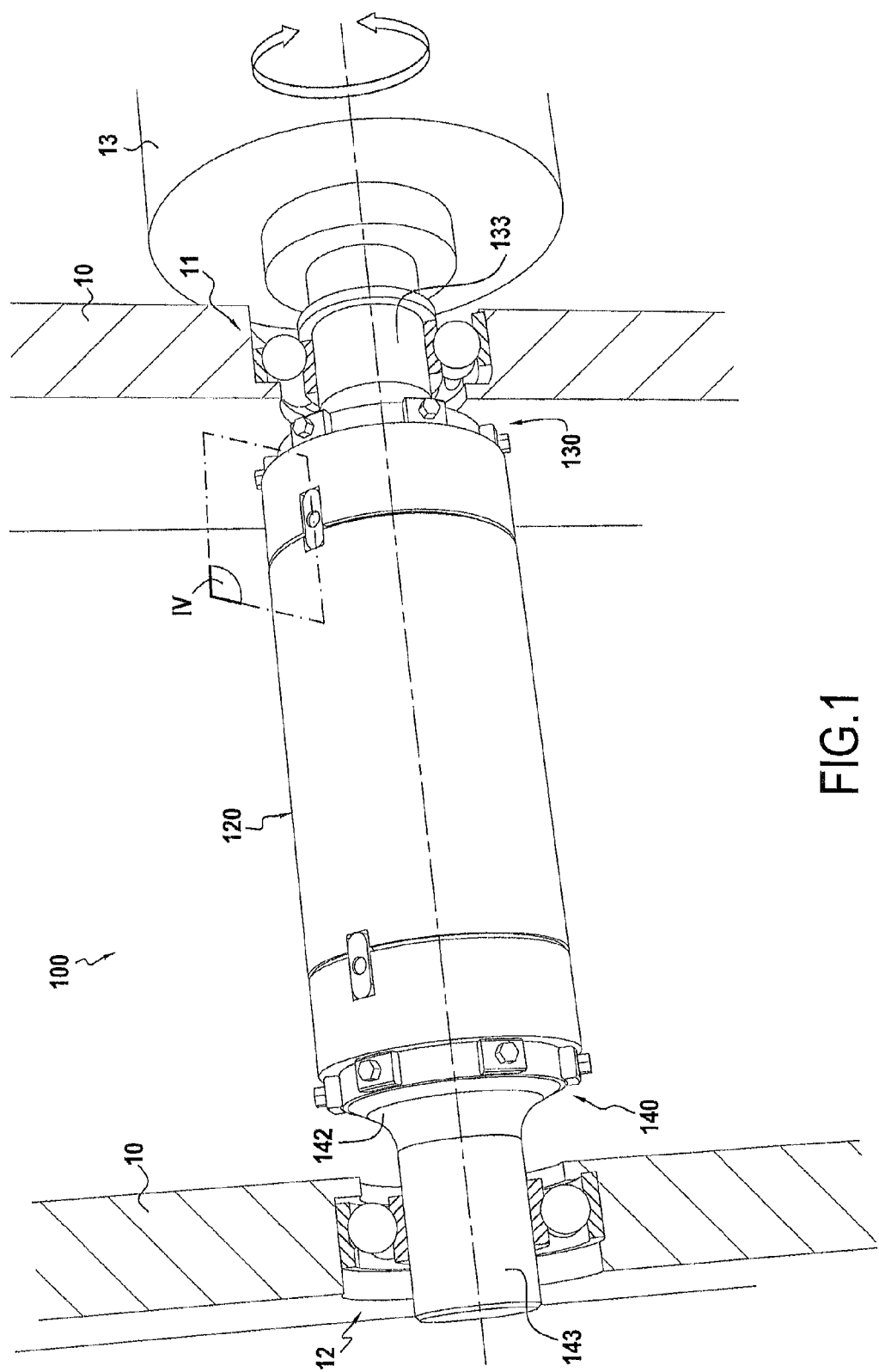
FIG. 1 is a diagrammatic view of a roller for a high temperature annealing line in an embodiment of the invention.
Figure 2:
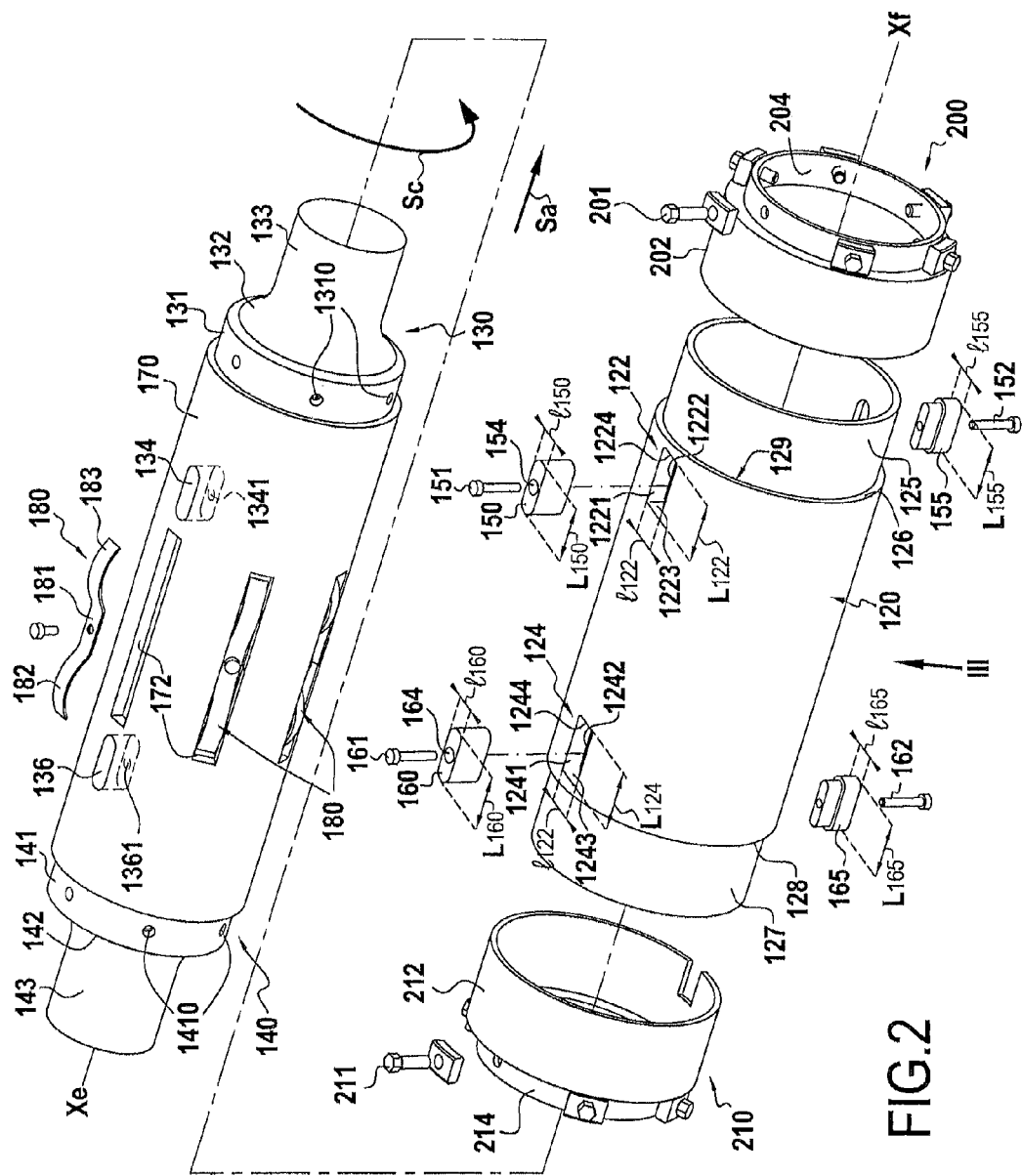
FIGS. 2 and 3 are fragmentary views of the FIG. 1 roller.
Figure 3:
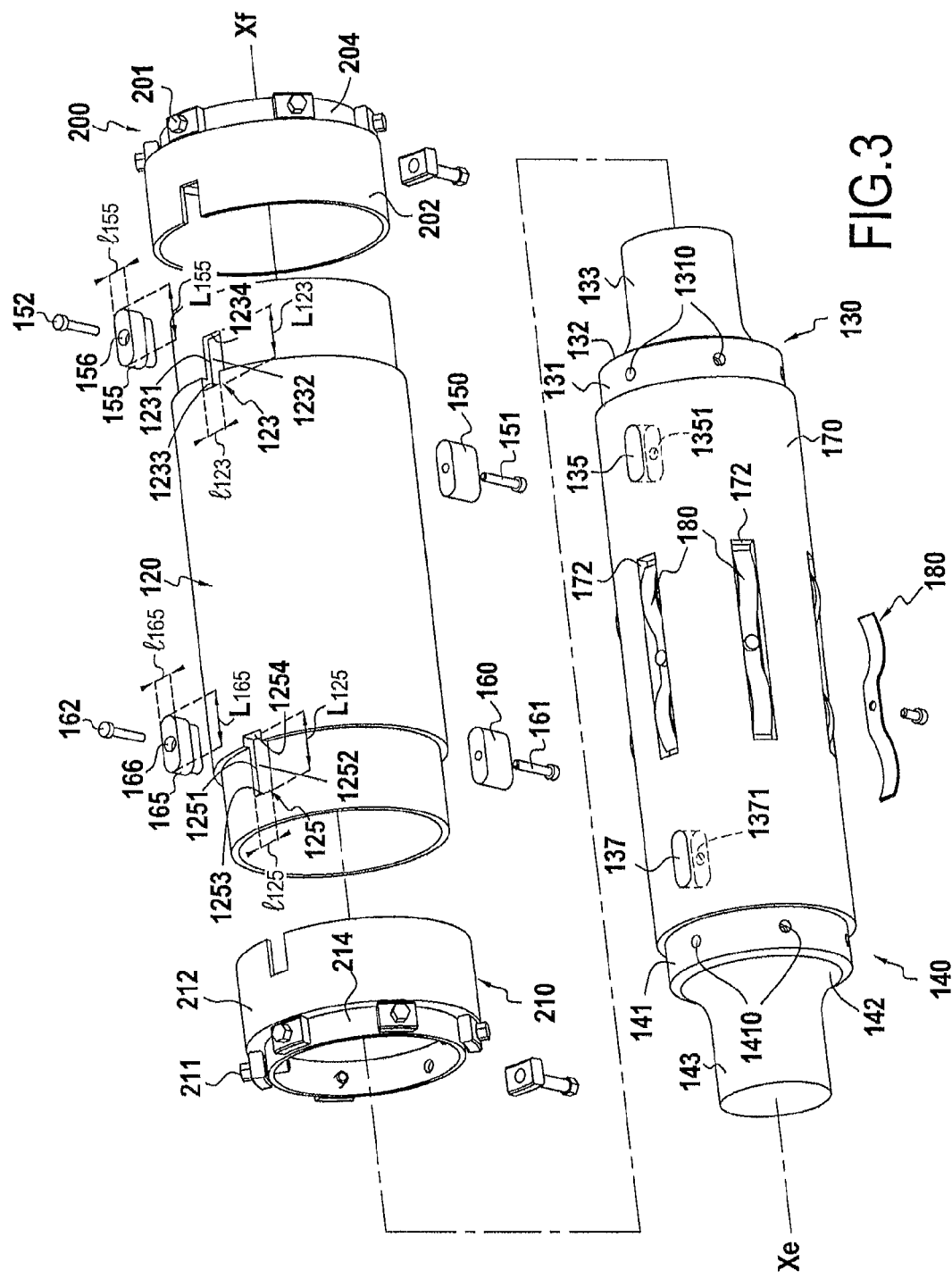

FIGS. 1 to 3 show a roller 100 in accordance with an embodiment of the invention suitable for use equally well for transporting, guiding, or shaping a sheet metal strip in an annealing line.

The roller 100 comprises a cylindrical shell or ferule 120 and an axial support element 170 having a first end including a spindle 130 and another end including a spindle 140.

In order to ensure reliable operation at temperatures greater than 1200° C., which metal rollers cannot withstand without deforming, and in order to do so while presenting mechanical strength that is greater than that of ceramics or of graphite, the cylindrical shell 120 is constituted by an axisymmetric part 121 made of thermostructural composite material, in particular out of carbon/carbon (C—C) composite material that, in known manner, is a material comprising carbon fiber reinforcement densified by a carbon matrix, or out of CMC composite material that, in known manner, is in particular made up of carbon or ceramic fiber reinforcement densified by a matrix that is ceramic, at least in part. Thermostructural composite materials, such as C—C or CMC materials, are characterized by good mechanical properties that make them suitable for constituting structural parts, and by their capacity to conserve those mechanical properties at high temperatures, which may be greater than 1300° C. for C—C or CMC material. The thermostructural composite material imparts sufficient mechanical strength to the casing for it to be self-supporting, i.e. for it to be capable of withstanding the forces to which the roller is subjected without internal support.

This type of material also presents a low coefficient of thermal expansion (about $2.5 \times 10^{-6}/°$ C. for C—C material) compared with the coefficients of metal materials such as steel (about $12 \times 10^{-6}/°$ C.). Consequently, the shell 120 constituting the portion of the roller 100 that is to be in contact with the sheet metal for treatment expands very little under the effect of temperature and it does not deform because of its high temperature mechanical characteristics.

Fabricating parts out of composite material, in particular out of C—C or CMC, is well known. It generally comprises making a carbon fiber preform of shape that is close to the shape of the part that is to be fabricated, and then densifying the preform with the matrix. CMC materials may also be made in which the reinforcement is made of ceramic fibers, such as SiC fibers. Nevertheless, in the present invention, carbon fiber reinforcement is used because the mechanical characteristics of ceramic fibers such as SiC fibers are degraded at high temperature, e.g. above 1200° C., whereas on the contrary the mechanical characteristics of carbon fibers improve at high temperature.

The fiber preform constitutes the reinforcement of the part and its role is essential in terms of mechanical properties. The preform is obtained from fiber textures made of carbon fibers. The fiber textures used may be of various kinds and shapes, such as in particular:
  two-dimensional (2D) fabric;
  three-dimensional (3D) fabric obtained by 3D weaving or from multiple layers;
  braiding;
  knitting;
  felt; and
  a unidirectional (UD) sheet of yarns or tows or a multidirectional (nD) sheet obtained by superposing a plurality of UD sheets in different directions and bonding the UD sheets together, e.g. by stitching, by a chemical bonding agent, or by needling.

It is also possible to use a fiber structure made up of a plurality of superposed layers of fabric, braid, knit, felt, sheets, tows, etc., which layers are bonded together, e.g. by stitching, by implanting yarns or rigid elements, or by needling.

Shaping is performed by filamentary winding, by winding a UD sheet on a mandrel, weaving, stacking, needling two-dimensional/three-dimensional plies or sheets of cables, etc.

With a C—C material, the fiber preform may be densified by a liquid technique with the preform being impregnated with a resin that is a precursor of the carbon matrix, such as a resin of the phenolic type.

After impregnation, the fiber preform that is to constitute the fiber reinforcement of the part that is to be made, and that has a shape that corresponds substantially to the shape of that part, is put into shape with the help of support tooling. The resin(s) is/are then transformed (polymerized/carbonized) by heat treatment. The impregnation and polymerization/carbonization operations may be repeated several times over, if necessary, in order to obtain determined mechanical characteristics.

The fiber preform may also be densified, in known manner, using a gaseous technique by chemical vapor infiltration (CVI) of the carbon matrix.

Densification combining a liquid technique and a gaseous technique is sometimes used in order to facilitate working, limit costs, and limit fabrication cycles while still obtaining satisfactory characteristics for the intended utilization.

The CMC materials that can be used for making the axisymmetric part constituting the shell of the roller of the invention are made up of carbon fiber reinforcement that is densified by a matrix that is ceramic, at least in part, in particular a carbide, nitride, refractory oxide, etc. matrix, e.g. such as a carbon-carbon/silicon carbide (C—C/SiC) composite material which is a material made up of carbon fiber reinforcement that has been densified with a matrix having a carbon phase and a silicon carbide phase, or a carbon-silicon carbide (C—C/SiC) composite material, which is a material made up of carbon fiber reinforcement densified with a silicon carbide matrix. With a C—C/SiC material, the carbon first phase of the matrix is deposited initially in order to be present close to the fibers, and is subsequently covered by an SiC second phase, thereby making it possible to form an SiC layer for providing protection against oxidation on the first phase that is made of carbon.

When densifying using a liquid technique, the matrix (or its ceramic phase) is made using a ceramic precursor resin that may, for example, be a polycarbosilane resin that is a precursor for silicon carbide (SiC), or a polysiloxane resin that is a precursor for SiCO, or a polyborocarbosilazane resin that is a precursor for SiCNB, or a polysilazane resin (SiCN). For a C—C/SiC material, the fiber preform is initially impregnated with a resin that is a precursor for the carbon phase of the matrix, such as a resin of phenolic type.

When densifying by a gaseous technique, e.g. by chemical vapor infiltration (CVI), the matrix (or its ceramic phase) is made by using a gaseous precursor of SiC, which, e.g. when making a C—SiC material, may be methyltrichlorosilane (MTS) that gives SiC as a result of decomposing the MTS. When making a C—C/SiC material, the carbon first phase may be formed with hydrocarbon gases, such as methane and/or propane giving carbon by cracking, and the SiC second phase is then deposited on the carbon first phase, e.g. by decomposing MTS.

Naturally, densification may involve combining both a liquid technique and a gaseous technique.

The axial support element 170 and the spindles 130 and 140 are made of metal material, e.g. of a stainless type steel. Each spindle 130, 140 comprises a mandrel 131, 141, and a frustoconical portion 132, 142 that is extended by a half-shaft 133, 143. The axial support element 170 and the spindles 130 and 140 may be made as a single part. In a variant, the spindles may be connected to the axial support element by releasable connection means, thereby presenting the advantage of enabling the two spindles to be separated from the axial support element, thus enabling one of those elements to be maintained or replaced in independent manner.

In the presently-described example, the roller 100 is arranged inside an enclosure 10 of an annealing line (FIG. 1). The half-shafts 133 and 143 are supported by respective bearings 11 and 12 of the enclosure 10. In the embodiment of FIG. 1, the shaft 133 is coupled with a rotary drive motor 13, while the shaft 143 is held in a bearing 12.

The cylindrical shell 120 is held axially in position on the axial element 170 by means of two rings or caps 200 and 210. More precisely, a smaller-section portion 204 of the cap 200 is fastened on the mandrel 131 of the spindle 130 by means of fastener members 201 (e.g. screws) co-operating with threaded holes 1310 formed in the mandrel 131 (FIGS. 2 and 3). Likewise, a smaller-section portion 214 of the cap 210 is fastened on the mandrel 141 of the spindle 140 by means of fastener members 211 (e.g. screws) co-operating with threaded holes 1410 formed in the mandrel 141 (FIGS. 2 and 3). The smaller-section portions 204 and 214 are extended respectively by cylindrical portions 202 and 212 forming centering spacers as explained below:

As shown in FIGS. 2 to 4, the axial support element 170 includes first and second housings 134 and 135 in the vicinity of the spindle 130, the housing 134 being for receiving a first key 150 (FIG. 5) and the housing 135 being for receiving a second key 155 (FIG. 6). The keys 150 and 155 are made of metal material, e.g. of the same material as the spindles 130 and 140. The keys 150 and 155 are generally in the form of rectangular parallelepipeds that extend over respective lengths $L_{150}$ and $L_{155}$ (for the top portion 155a), respective widths $\lambda_{150}$ and $\lambda_{155}$ (for the top portion 155a), and respective depths $P_{150}$ and $P_{155}$. The key 155 has a top portion 155a for placing in a through opening formed in the shell 120 as described in detail below and a bottom portion 155b of smaller length and width for co-operating with the housing 135. The dimensions of the top portion 155a of the key 155 may be adjusted if necessary (machining) in order to ensure that the final assembly fits.

The first key 150 is fastened in the first housing 134 by inserting a screw 151 through a passage 154 formed in the key and by tightening the screw in a hole 1341 made in the bottom of the housing 134 and including tapping that matches the thread of the screw 151 (not shown in FIG. 4). Naturally, it is possible to envisage using other means for fastening the key in the housing 1341. Likewise, the second key 155 is fastened in the second housing 135 by inserting a screw 152 through a passage 156 formed in the key and by tightening the screw in a hole 1351 formed in the bottom of the housing 135 and including tapping matching the thread of the screw 152 (not shown in FIG. 4).

In order to allow the keys to pass through the shell 120, while still allowing the shell to be driven in rotation by the axial element 170, first and second through openings 122 and 123 are formed in the shell. The first through opening 122 is for co-operating with the first housing 134 and the second through opening 123 is for co-operating with the second housing 135. In a travel direction Sc along the circumference of the shell 120, the first through opening 122 comprises first and second circumferential bearing surfaces 1221 and 1222. In an axial travel direction Sa, the first opening 122 also includes first and second longitudinal bearing surfaces 1223 and 1224. Likewise, in the travel direction Sc along the circumference of the shell 120, the second through opening 123 includes first and second circumferential bearing surfaces 1231 and 1232, and in the axial travel direction Sa it includes first and second longitudinal bearing surfaces 1233 and 1234.

The first through opening 122 presents dimensions, specifically a length $L_{122}$ and a width $\lambda_{122}$, that are greater than the dimensions of the first key 150, specifically its length $L_{150}$ and its width $\lambda_{150}$. Likewise the second through opening 123 presents dimensions, specifically a length 123 and a width $\lambda_{123}$, that are greater than the dimensions of the second key 155, specifically its length $L_{155}$ and its width $\lambda_{155}$.

Figures 7, 8:
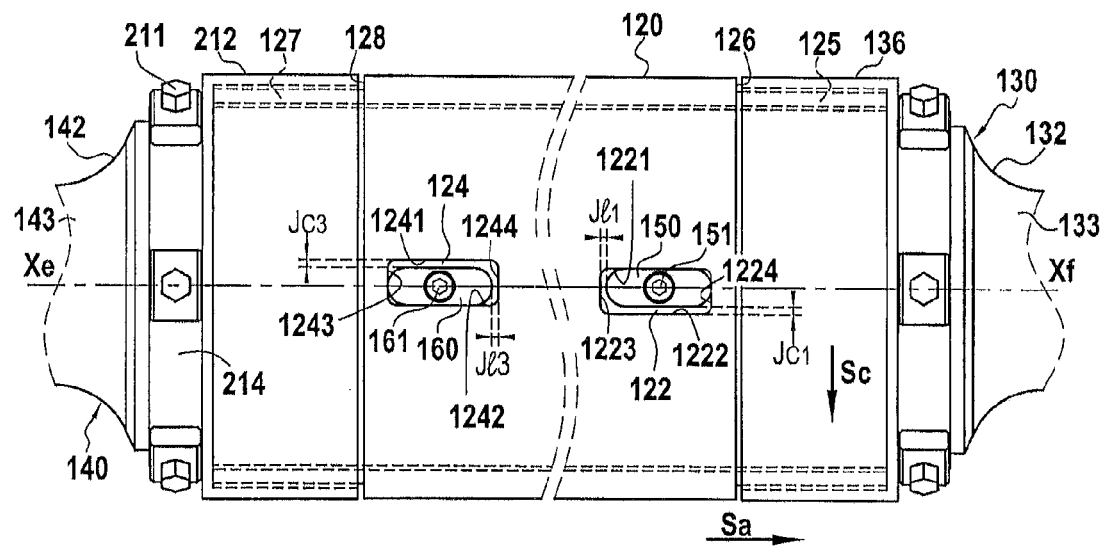
FIGS. 7 and 8 are detail views of portions of the FIG. 1 roller.
Figure 9:
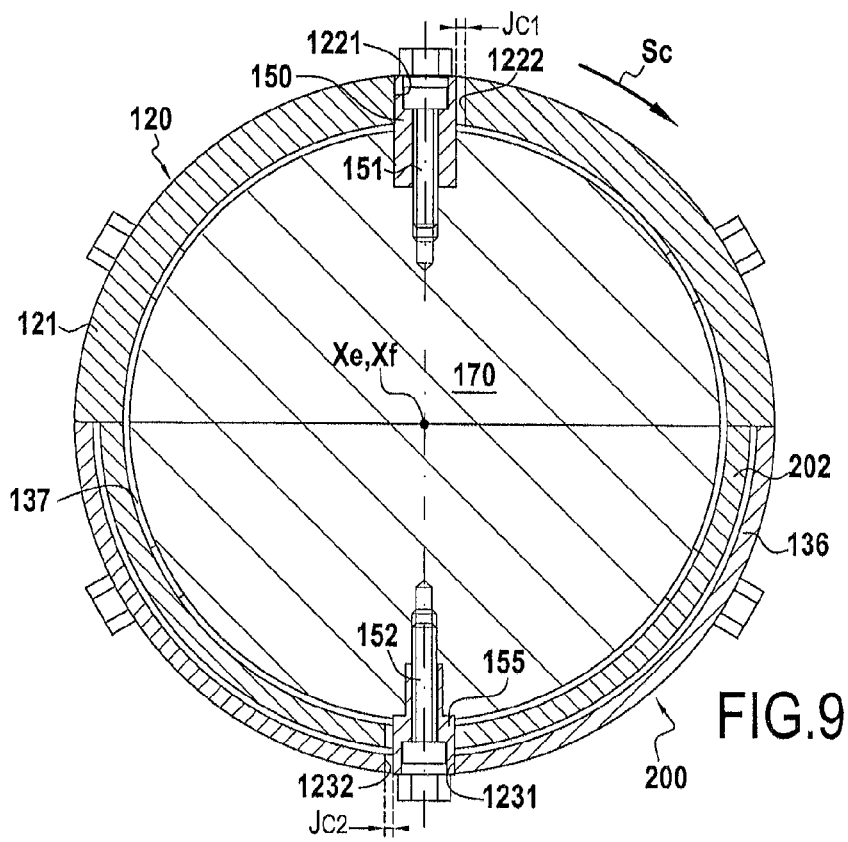
FIGS. 9 and 10 are revolved section views respectively on planes IX-IX and X-X of FIG. 1.

In accordance with the invention, and as shown in FIGS. 7 and 9, the first key 150 is mounted to bear against the first circumferential bearing surface 1221 of the first through opening 122 so as to leave circumferential clearance $J_{C1}$ between the key 150 and the second circumferential bearing surface 1222 of the opening 122. The first key 150 is also mounted to bear against the second longitudinal bearing surface 1224 of the first through opening 122 so as to leave longitudinal clearance $J_{\lambda 1}$ between the key 150 and the first longitudinal bearing surface 1223 of the opening 122.

Figure 10:
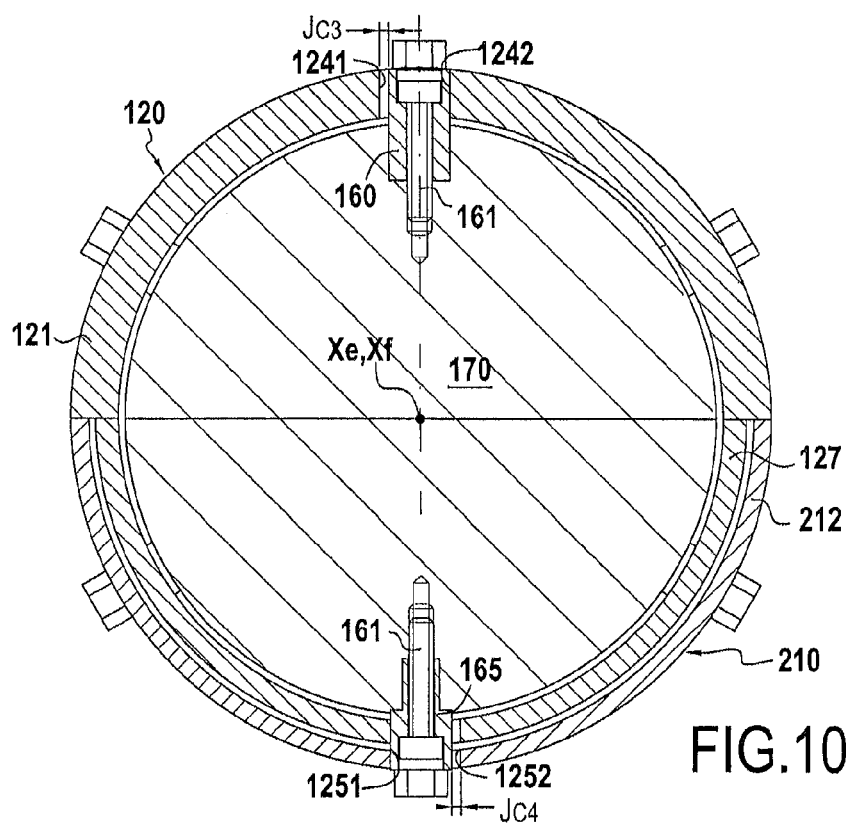

Still according to the invention and as shown in FIGS. 8 and 10, the second key 155 is mounted to bear against the second circumferential bearing surface 1232 of the second through opening 123 in such a manner as to leave circumferential clearance $J_{C2}$ between the key 155 and the first circumferential bearing surface 1231 of the opening 123. The second key 155 is also mounted to bear against the first longitudinal bearing surface 1233 of the second through opening 123 so as to leave longitudinal clearance $J_{\lambda 2}$ between the key 155 and the second longitudinal bearing surface 1234 of the opening 122.

Because of the opposing thrusts directed both circumferentially and longitudinally by the first and second keys 150 and 155 against the circumferential and longitudinal bearing surfaces of the through openings 122 and 123, it is possible to hold the shell radially and axially in position relative to the axial support element 170, while also limiting the stresses exerted by the keys on the shell during expansion of the keys and/or of the axial support element 170 Because of the circumferential clearances $J_{C1}$ and $J_{C2}$ and the longitudinal clearances $J_{\lambda 1}$ and $J_{\lambda 2}$ left between the keys 150 & 155 and the through openings 122 & 123, respectively.

The opposing circumferential thrusts from the keys 150 and 155 against the respective circumferential bearing surfaces 122 and 123 of the through openings 1221 and 1232 of the through openings 122 and 123 also serve to transmit rotary torque to the shell 120 in both directions of rotation.

The keys 150 and 155, and consequently the through openings 122 and 123 in the shell (and the housings 134 and 135) are preferably located in positions that are radially opposite relative to the axis Xe of the shell 120, as shown in FIG. 9. By placing the axial bearing points of the keys against the shell in a common plane perpendicular to the axis Xe of the shell, stresses between the keys and the shell are reduced in the event of expansion.

Furthermore, as shown in FIG. 4, the keys 150 and 155 are preferably axially offset along the axis Xe of the shell. This offset also serves to reduce stresses between the keys and the shell in the event of expansion.

In the presently-described example, the axial support element 170 also includes third and fourth housings 136 and 137 in the vicinity of the spindle 140, the housing 136 being for receiving a third key 160 (FIGS. 2 and 3) similar to the key 150, and the housing 137 being for receiving a fourth key 165 (FIGS. 2 and 3) similar to the key 155.

The third key 160 is fastened in the third housing 136 by inserting a screw 161 through a passage 164 formed in the key 160 and tightening the screw in a hole 1361 formed in the bottom of the housing 136 and having tapping matching the thread of the screw 161 (not shown in FIG. 4).

Likewise, the fourth key 165 is fastened in the second housing 137 by inserting a screw 162 through a passage 166 formed in the key 165, and tightening the screw in a hole 1371 formed in the bottom of the housing 137 and including tapping matching the thread of the screw 162 (not shown in FIG. 4).

In order to enable the keys to pass through the shell 120 while enabling the shell to be driven in rotation by the axial element 170, third and fourth through openings 124 and 125 are formed in the shell. The third through opening 124 is for co-operating with the third housing 136, while the fourth through opening 125 is for co-operating with the fourth housing 137. In the travel direction Sc along the circumference of the envelope 120, the third through opening 124 has first and second circumferential bearing surfaces 1241 and 1242, and in an axial travel direction Sa it has first and second longitudinal bearing surfaces 1243 and 1244. Likewise, in the travel direction Sc along the circumference of the shell 120, the fourth through opening 125 has first and second circumferential bearing surfaces 1251 and 1252, and in the axial travel direction Sa, it has first and second longitudinal bearing surfaces 1253 and 1254.

The third through opening 124 presents dimensions, specifically a length $L_{124}$ and a width $\lambda_{124}$, that are greater than the dimensions of the third key 160, specifically a length $L_{160}$ and a width $\lambda_{160}$. Likewise, the fourth through opening 125 presents dimensions, specifically a length $L_{125}$ and a width $\lambda_{125}$, that are greater than the dimensions of the fourth key 165, specifically a length $L_{165}$ and a width $\lambda_{165}$.

In accordance with the present invention, and as shown in FIGS. 7 and 10, the third key 160 is mounted to bear against the second circumferential bearing surface 1242 of the third through opening 124 so as to leave circumferential clearance $J_{C3}$ between the key 160 and the first circumferential bearing surface 1241 of the opening 124. The third key 160 is also mounted to bear against the first longitudinal bearing surface 1223 of the third through opening 124 so as to leave longitudinal clearance $J_{\lambda3}$ between the key 160 and the second longitudinal bearing surfaces 1244 of the opening 124.

Still according to the invention and as shown in FIGS. 7 and 10, the fourth key 165 is mounted to bear against the first circumferential bearing surface 1251 of the fourth through opening 125 so as to leave circumferential clearance $J_{C4}$ between the key 165 and the second circumferential bearing surface 1252 of the opening 125. The fourth key 165 is also mounted to bear against the second longitudinal bearing surface 1254 of the fourth through opening 125 so as to leave longitudinal clearance $J_{\lambda4}$ between the key 165 and the first longitudinal bearing surface 1253 of the opening 125.

The circumferential and longitudinal bearing surfaces between the keys 160 and 165 and the through openings 124 and 125 of the shell 120 are arranged in opposite manner relative to the circumferential and longitudinal bearing surfaces between the keys 150 & 155 and the through openings 122 & 123. This serves to ensure stable transmission of rotary drive between the portion of the roller situated close to the keys 150 and 155 that transmit torque to the shell 120 from the motor 13 coupled to the shaft 131 and the opposite portion situated close to the spindle 140 and the keys 160 and 165.

By means of the circumferential and longitudinal opposing thrusts of the third and fourth keys 160 and 165 against the circumferential and longitudinal bearing surfaces of the through openings 124 and 125, it is possible to hold the shell radially and axially in position relative to the axial support element 170 while also limiting the stresses exerted by the keys on the shell during expansion of the keys and/or of the axial support element 170 because of the circumferential clearances $J_{C3}$ and $J_{C4}$ and because of the longitudinal clearances $J_{\lambda3}$ and $J_{\lambda4}$ left between the keys 160 & 165 and the through openings 124 & 125, respectively.

The keys 160 and 165 and consequently the through openings 124 and 125 in the shell (and also the housings 136 and 137) are preferably placed in positions that are radially opposite relative to the axis Xe of the shell 120 as shown in FIG. 10. By placing the axial bearing points of the keys against the shell in a common plane perpendicular to the axis Xe of the shell, stresses between the keys and the shell are reduced in the event of expansion.

Furthermore, as shown in FIG. 4, the keys 160 and 165 are preferably axially offset along the axis Xe of the shell. This offset also serves to reduce stresses between the keys and the shell in the event of expansion.

Furthermore, and as shown in FIG. 4, the longitudinal bearing surfaces of the keys 150 and 155 against the shell 120, and also the longitudinal bearing surfaces of the keys 160 and 165 against the shell 120 are preferably in alignment on a common radial plane so as to avoid simultaneously exerting opposing forces on the shell 120, which forces might damage it.

As shown in FIGS. 2 to 4, the axial support element 170 has a plurality of flexible spring tongues 180 that are uniformly distributed around the circumference of the axial support element. In the presently-described example, each tongue 180 has a central fastening base 181 that is fastened in the bottom of a housing 172 formed in the outer surface of the axial support element 170. Nevertheless, the tongues could be fastened directly on the outer surface of the axial support element. Each tongue 180 also includes two curved portions 182 and 183 extending on either side of and above the fastener base 181. These curved portions 182 and 183 are for coming into contact with the inner surface of the shell.

The tongues may be made of a metal material or of a thermostructural composite material such as C—C or C—C/SiC depending on the temperature levels reached in this location of the roller.

The tongues 180 serve both to center the shell 120 on the axial support element 170 when cold, and to compensate the differential expansion between the shell made of thermostructural composite material and the axial support element made of metal.

Figure 11:
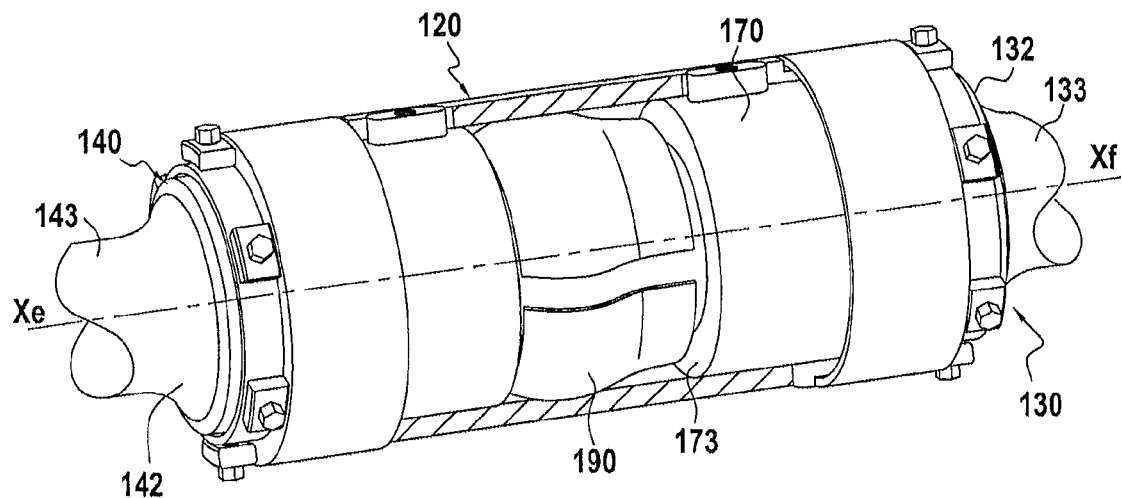
FIG. 11 is a fragmentary perspective view showing a variant embodiment of an elastically deformable element for compensating differential expansion between the axial support element and the shell of the roller of the invention.

In a variant embodiment shown in FIG. 11, a spring blade 190 in the form of a split ring may be arranged around the axial support element 170, which element then includes an annular groove 173 for holding the spring blade axially.

In yet another variant embodiment, cold centering of the shell and compensation of differential expansion relative to the axial support element may be provided by skids made of graphite sheet that are arranged axially on the outer surface of the axial support element, like the above-described tongues.

According to another aspect of the invention, the cap 200 has a centering spacer 202 co-operating with a smaller-section portion 125 present at the end of the shell 120 and defining a shoulder 126 (FIG. 4). Likewise, the cap 210 has a centering spacer 212 co-operating with a smaller-section portion 127 present at the other end of the shell 120 and defining a shoulder 128 (FIG. 4). Each of the spacers 202 and 212 define respective recesses in which the smaller-section portions 125 and 127 of the shell 120 engage, thereby enabling the axis Xf of the metal spindles 130 and 140 to be centered on assembly with the axis Xe of the shell 120 made of thermostructural composite material.

The invention claimed is:

1. A roller for a high temperature annealing line, the roller comprising a cylindrical shell made of composite material, an axial support element made of a metal material, the axial support element including a longitudinal axis located at a central rotational axis of the axial support element, and a spindle located at least one of a first and second longitudinal end of the axial support element, wherein the roller comprises at least first and second keys fastened to the axial support element and each key arranged in a respective first or second through opening formed in the shell, said through openings presenting dimensions that are greater than the dimensions of the keys, each through opening including, in a determined travel direction along the circumference of the shell, first and second circumferential bearing surfaces and, in a determined axial travel direction, first and second longitudinal bearing surfaces;

wherein the first key is mounted to bear against the first circumferential bearing surface and the second longitudinal bearing surface of the first through opening without bearing against the second circumferential bearing surface and the first longitudinal bearing surface; and wherein the second key is mounted to bear against the second circumferential bearing surface and the first longitudinal bearing surface of the second through opening without bearing against the first circumferential bearing surface and the second longitudinal bearing surface.

2. A roller according to claim 1, wherein the first and second keys are arranged in a plane perpendicular to a longitudinal axis of the shell.

3. A roller according to claim 1, in that wherein the first and second keys are offset along a longitudinal axis of the shell.

4. A roller according to claim 1, wherein the first and second longitudinal bearing surfaces are in alignment in a common radial plane.

5. A roller according to claim 1, wherein:

the first and second keys are located proximal to the first end of the axial support element, the roller further including at least third and fourth keys are located proximal to the second end of the axial support element, said third and fourth keys being fastened to the axial support element and each being arranged in a respective third or fourth through opening formed in the shell, said through openings presenting dimensions greater than the dimensions of the keys, each through opening including, in said determined travel direction along the circumference of the shell, first and second circumferential bearing surfaces and, in said determined axial travel direction, first and second longitudinal bearing surfaces;

wherein the third key is mounted to bear against the second circumferential bearing surface of the third through opening, while the fourth key is mounted against the first circumferential bearing surface of the fourth through opening; and wherein the third key is mounted to bear against the first longitudinal bearing surface of the third through opening, while the fourth key is mounted against the second longitudinal bearing surface of the fourth through opening.

6. A roller according to claim 5, wherein the third and fourth keys are arranged in a plane perpendicular to a longitudinal axis of the shell.

7. A roller according to claim 5, wherein the third and fourth keys are offset along the longitudinal of the shell.

8. A roller according to claim 5, wherein the third and fourth longitudinal bearing surfaces are in alignment in a common radial plane.

9. A roller according to claim 1, comprising at least one elastically deformable element arranged between an outer surface of the axial support element and an inner surface of the shell; and wherein the outer surface of the axial support element and the inner surface of the shell define a circumferential space between the outer surface of the axial support element of the inner surface of the shell.

10. A roller according to claim 9, comprising a plurality of spring tongues uniformly distributed in the circumferential space.

11. A roller according to claim 9, comprising a plurality of graphite sheet skids uniformly distributed in the circumferential space.

12. A roller according to claim 9, comprising a spring blade in the form of a split ring arranged in the circumferential space.

13. A roller according to claim 1, wherein the shell is made of C—C or CMC composite material.

* * * * *